No. 2,801,874

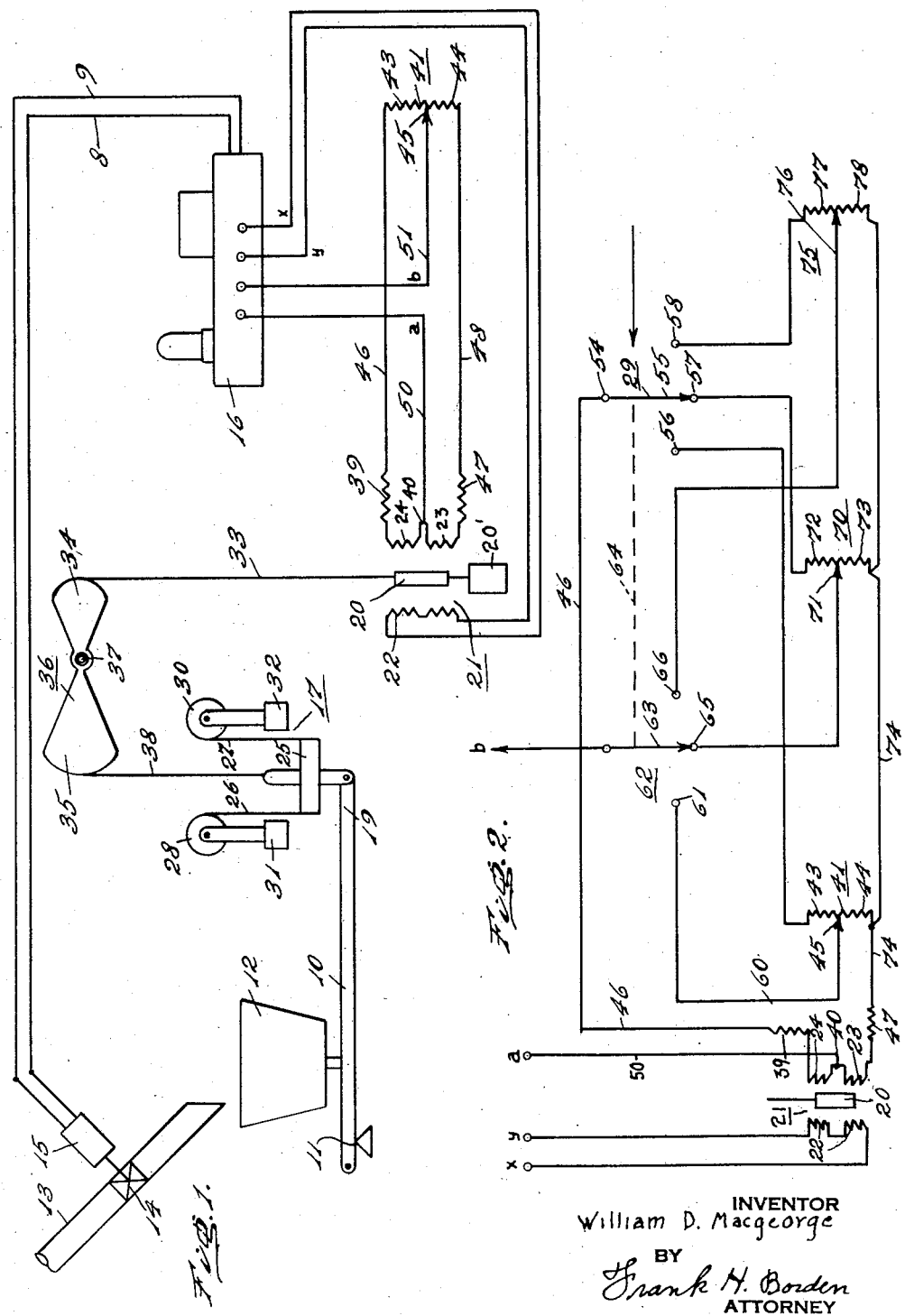

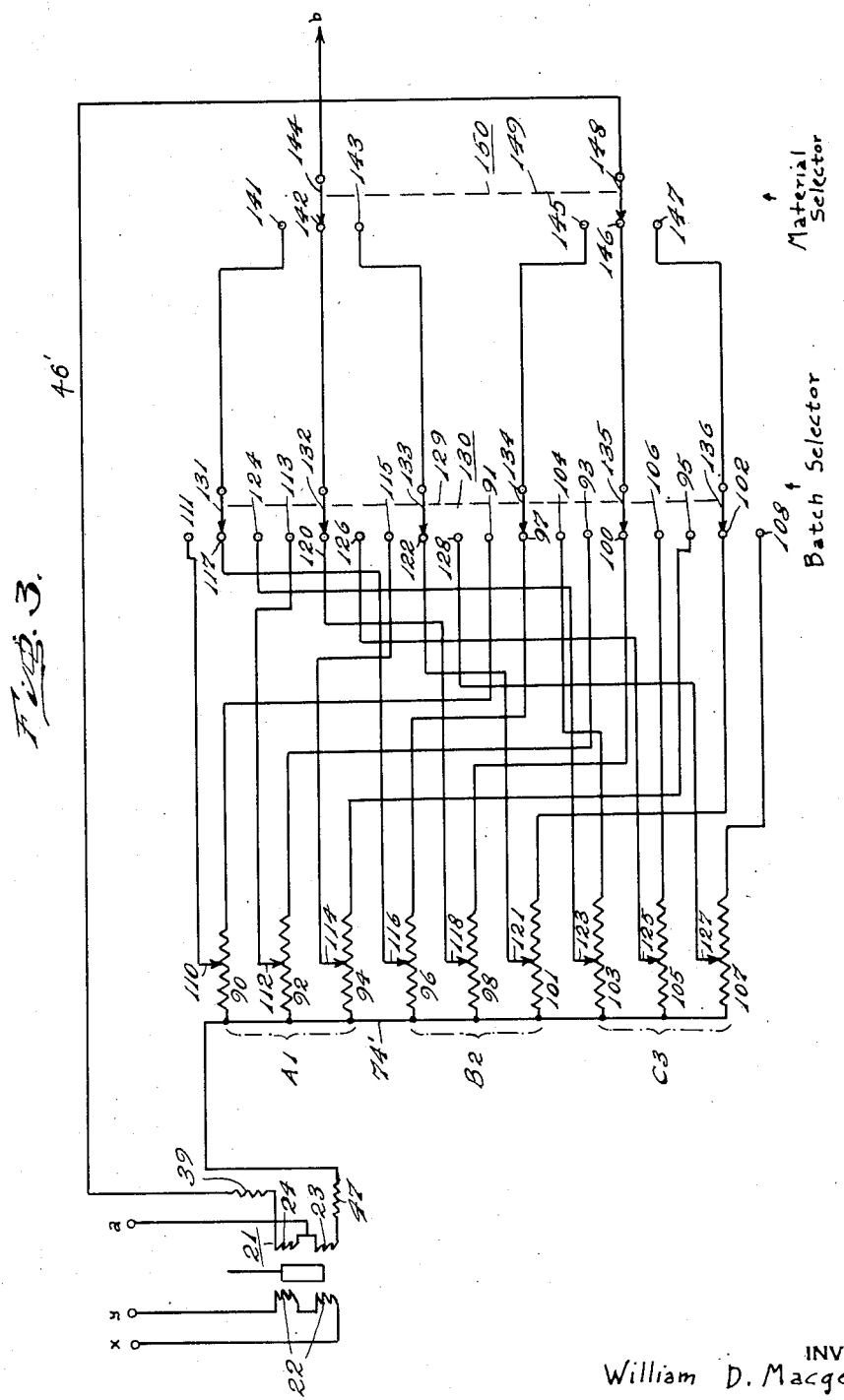

United States Patent Office
Patented Aug. 6, 1957

2,801,874

APPARATUS FOR EFFECTING AUTOMATIC BATCHING OF COMPOSITE MIXTURES

William D. Macgeorge, Collegeville, Pa., assignor to Automatic Temperature Control Co., Inc., Philadelphia, Pa., a corporation of Pennsylvania Application April 3, 1952, Serial No. 280,240

5 Claims. (Cl. 249—14)

This invention relates to apparatus for effecting automatic batching of composite mixtures.

In present batching procedures, so far as known, with any given formula, it is necessary to provide individually weighed or measured units of the respective ingredients of the formula, as a manual operation. This is a time-consuming and expensive procedure. Usually the particular formula is written and must be found and analyzed as to supplies of the particular ingredients or components of the formula. Then the calculated amounts of the respective ingredients of the particular formula are individually weighed out, and placed in the ultimate mixing chamber. The manual measuring requires care and may involve placing too much on the scale, requiring additional labor and time for removal of the exact excess in bringing the scale to balance. While ultimately effective, such batching procedures are quite unsatisfactory. As noted, also, they are slow and involve considerable labor costs.

Applicant provides an apparatus in which a great multiplicity of formulae can be inserted as adjustments of electrical devices in an electrical network and in which, although any or all of the formulae can instantly be changed to accord with desired variations in relative proportions of ingredients, when set or established each is complete, and needs no reference to written formulae records, other than to numerical or sequential designations of the respective formulae by manual settings of a multipole batch switch.

The batch switch is provided for switching instantly from one formula to any other desired formula. Material supply devices are provided, with means for delivering the respective materials to a common weigh chamber under the control of an electrically controlled device. Relay switching means are provided by which automatically measured amounts of all of the respective materials of a selected formula are successively deposited as weighed exact proportionate amounts of the ultimate mixture. It will be understood that although it is preferred to use the entire apparatus, such portions thereof as can effect the proportioning of all of the materials in a given type of formula alone, as in batching concrete, for example, in which the ingredients are respectively all the same, but the proportions vary as manual electrical settings in the apparatus in accordance with necessities, may be so used. It is further contemplated that the specific organization by which a single material may be measured and weighed automatically, may also be used of and by itself.

The system involved herein allows preset cut-off on a standard mechanical scale without the introduction of control circuit loads on the delicate balance of the scale. Previous efforts toward preset cut-off have necessitated the use of devices such as photo-electric cells and the like, with their recognized difficulties of adjustment.

While the invention is applicable to any sort of batching procedures, a typical wide use thereof is found in the chemical industry. For general purposes and in the interests of simplicity, the invention will be explained specifically in connection with the formation of concrete. As noted, although all concrete is formed basically of cement, sand and aggregate, the relative proportions thereof are susceptible to wide variations.

As will later become evident, applicant has provided a fundamental and new circuit by which the attainment of any predetermined condition of a variable can be determined and signalled, which is not limited to weight as the variable. In this circuit a differential transformer is provided having two secondaries in aiding relation and having a center tap. An armature subject to displacement relative to said secondaries is provided to vary the voltage induced respectively therein and having a datum relative position of equal or predeterminedly differential voltages in said respective secondaries. A primary is provided for energizing said secondaries and thus the voltage bridge. A potentiometer is provided having a sliding arm dividing the potentiometer into two legs, forming with said secondaries a voltage bridge, in which, with the armature relatively at datum, adjustments of the potentiometer arm unbalances the bridge circuit and effects a signal in the output, related to an ultimate condition of a variable imposed upon the armature, pursuant to which a change of the variable incident on said armature relatively moves same from datum to rebalance the bridge circuit and cancel out the signal, as a function of the change in condition of said variable as a measure of the change therein.

It is among the objects of this invention to improve measuring circuits; to provide a measuring circuit adjustable to measure a given amount of a given material, of itself or as a component or ingredient of a batch of materials, with means for easily and accurately varying the amount thereof to be measured; to provide control means operated as a function of a control circuit condition for initiating the movement of a material from a supply to a weigh chamber, and to shut off said supply when a predetermined value of said material in the weigh chamber has been effected; to provide a batching circuit in which a plurality of independent materials are successively moved in measured quantities into a weigh chamber for immediate or ultimate mixing, controlled by plural independently adjustable circuits, each of which predetermines the quantity of a related material introduced into the weigh chamber, with means for varying the relative proportions of the respective materials; to provide a plurality of batching circuits any one of which provides for the successive introduction of a variable but predetermined weight of a given material of the plurality comprising the batch into a weigh chamber, and by which automatically or manually, one batching circuit with its preset but variable quantitative relations is replaced by another completely independent batching circuit with preset but variable quantitative controls for the ingredients of the second batch; to effect improvements in the circuit disclosures of Macgeorge application Serial No. 246,298, now abandoned and refiled as co-pending application Serial Number 435,896 on June 10, 1954, on a Telemetering System; to improve methods of batching; to provide an apparatus in which batch data is stored, for selective use for batching; to provide an apparatus in which a plurality of batch formulae is stored and by which the ingredients of any selected batch can be successively placed in a weigh chamber in accurately weighed condition; to improve electrical control systems; to provide an instant and inertialess means of controlling the feed of the various materials into a weigh chamber in accordance with the weight of said weigh chamber.

Other objects and advantages of the invention will become apparent as the description proceeds.

In the accompanying drawings, forming part of this disclosure:

Fig. 1 represents a diagram of apparatus including a circuit operable to permit the passage of a given weight of material from a supply hopper to a weigh chamber with means for varying the given weight, with the control circuit operative for stopping the supply upon attainment of the given weight in the weigh chamber, effective for a single weighing operation, but forming one of a plurality of similar organizations in the later recited circuits.

Fig. 2 represents a wiring diagram of a batching circuit incorporating, illustratively, three batch-component circuits, each of which latter comprise an individual circuit and organization in accordance with the disclosure of Fig. 1 with relay means for automatically feeding and weighing successively a plurality of respective ingredients of the batch.

Fig. 3 represents a wiring diagram of a multibatch feeding system with means for storing the batch data of each of a plurality of formulae, any one batch feeding circuit of which comprises a circuit similar to that of Fig. 2, with manual or automatic means for shifting between respective batch circuits.

Applicant has discovered that a simple, accurate and efficient control circuit can be effected by the combination in a voltage bridge circuit of a differential transformer, comprising two secondary coils and an exciting primary, and an armature shiftable axially with respect to the secondaries, in which the respective secondaries, plus, if necessary, small added resistances, form two legs of a bridge circuit in which the other two legs are formed by the sides of a potentiometer, divided by the slide element thereof. As disclosed by said co-pending application, Ser. No. 435,896, any given voltage unbalance of the bridge circuit established by an imposed signal can be nullified and voltage rebalance of the bridge established by axial shifting of the armature of the differential transformer in the proper sense to so change the mutual coupling between the armature and the respective secondaries as to accomplish stable rebalance of the bridge voltages. This requires a servomotor responsive to bridge output for repositioning the transformer armature so as to rebalance the bridge while measuring or indicating the applied signal. The voltage bridge of said application is modified herein by having the initial unbalance of the bridge detemined by the variable setting of the potentiometer and by providing a relay in the bridge output circuit, in conjunction with an electrically controlled material flow regulating valve operated by the relay in the bridge output circuit and with means for translating applied weight of material deposited operatively on the translating means into armature shift to rebalance the bridge and shut off the material flow.

Referring to Fig. 1, for the basic single commodity or ingredient control, a weighing beam 10 is provided, pivoted, at 11, and mounting a weigh chamber or weighing repository 12. A chute 13 is provided through which a given material flows from a supply hopper (not shown) controlled by a valve or gate 14, conntrolled in its opening and closing by the energization or deenergization of solenoid 15. The latter is connected to and electrically controlled by a valve or gate 14, controlled in its open-relay unit 16. It will be assumed that actuation or energization of the solenoid 15 opens valve 14 and permits flow of the fluent materials through conduit 13 into weigh chamber 12. Opening the circuit through the solenoid 15 closes valve 14, shutting off the flow. Of course, this can be reversed with proper spring bias on the solenoid and valve. In this connection it will be understood that although most of the materials used will be fluent, whether liquids, or granules or the like, any other sort of materials may be imposed upon weigh chamber 12, even with manual loading. Thus, with large and non-fluent aggregate, these may be manually placed in weigh chamber 12 and the working of the circuit and automatic switching to adjacent circuits for the next automatically delivered ingredient will be accomplished, regardless of whether in the one instance the solenoid valve is controlling. Of course, such manual loading is the exception and generally all loading will be automatic. A conveyor or conveyors may replace chute 13 and be stopped or started by the action of relay 16.

In the illustration given in Fig. 1 the free end 19 of lever or beam 10 connects with a pendulum-translating device 17, for axially actuating the armature 20 of the differential transformer 21. The translating device normally returns the armature 20 to datum position with no weight in the weigh chamber. The beam 10, weigh chamber 12, and device 17 constitute a weighing scale. The differential transformer comprises one, or a pair, of series-connected primaries 22, in inductive relation to a first secondary 23 and a second secondary 24. Any of the prior art differential transformers may be used, modified to effect series aiding relation of the secondaries, with a center tap connection, in which a movement of the armature 20 in one direction or the other from a median setting at which equal voltages are induced in secondaries 23 and 24, induces an increased voltage in one secondary and a reciprocally decreased voltage in the other secondary. It is this modified form of movable armature electrical device which is intended to be described by the term "differential transformer" as used herein, in distinction from those devices in which the secondaries are in series bucking relation. It is preferred to use a transformer constructed in accordance with applicant's Patent No. 2,568,587, dated September 18, 1951, and with the divisional application Ser. No. 244,484, filed August 31, 1951, now eventuated into Patent No. 2,640,-967, issued June 2, 1953. Illustratively, the translating device 17 comprises a vertically movable platform 25 suspended on two straps or cables 26 and 27. The straps respectively are connected to the peripheries of two cams 28 and 30, respectively rigidly mounting the weighted pendulum arms 31 and 32. The armature 20 is suspended at one end of a cable 33, connected to the periphery of rounded lever end 34 of a lever 36. The end 34 is integral with a similar rounded lever end 35, forming the lever 36, rocking on a pivot 37. Finally, a cable 38 extends from the platform 25 to the periphery of the rounded lever end 35. The fall of the platform 25 from datum will be accompanied by a complemental rise of the armature 20 relative to the secondaries 24 and 23 of the differential transformer 21. When weight is removed from the weigh chamber, the pendulum arms fall and the armature returns to datum. A counterweight 20' may be associated with armature 20. The method of attaching the armature 20 to the weighing system may be varied. That disclosed is purely illustrative.

The secondaries 23 and 24 of the differential transformer are in series, having a center-tap connection 40. A potentiometer 41 is provided having legs 44 and 43, established by the positioning of the adjustable arm 45 of the potentiometer 41. The external end of secondary 24, leads through resistance 39, by connector 46 to the external end of potentiometer leg 43, and secondary 24 and leg 43 form two legs or one-half of a voltage bridge circuit. The external end of secondary 23 of the transformer leads, through resistance 47, by connector 48 to the outer end of leg 44 of the potentiometer, and secondary 23 and leg 44 form two legs comprising the other half of the voltage bridge circuit. The center tap 40 leads through connector 50 to the amplifier and relay 16, as one lead of the voltage bridge output. Potentiometer arm 45 leads through connector 51 to the relay as the other output lead of the bridge. The relay 16, by leads 8 and 9, controls the energization and deenergization of solenoid 15 and thus the flow of material through chute 13 into weigh chamber 12.

It will be seen that with the armature 20 in a symmetrical position relative to the coils of the differential transformer, at a datum setting, correlated with "no weight" in the weigh chamber 12, and with the potentiometer arm 45 predeterminedly adjusted and positioned in accordance with the ultimate weight to be placed in the weigh chamber, and with the bridge powered by energization of the primary 22, with A. C., the bridge circuit will be unbalanced, a signal will be placed on the amplifier and relay unit 16, energizing (or deenergizing) the solenoid 15 to permit flow through chute 13 into the weigh chamber 12. When the desired weight is in the weigh chamber, and the free end 19 of lever or beam 10 moves downwardly, the armature 20 will move upwardly so as to rebalance the bridge circuit, which will trip the relay deenergize (or energize) the solenoid 15, and close the valve 14, shutting off the input to the weigh chamber 12. This allows pre-set cut-off on a standard mechanical scale without the introduction of control circuit loads on the delicate balance of the scale. So far as understood, this is the first time such accuracies of operation of pre-set cut-off has been achieved. The closest prior approach to this problem has involved photo-cells and the like, which are difficult to adjust. With the present invention, the control point is adjusted by means of the potentiometer, which is easily adjusted, and may be quite remotely positioned relative to the scale and the material supply.

In the single material use, the contents of the weigh chamber may be removed as desired, but it is preferred that the weigh chamber 12 be pivoted, and be tripped to dump the contents into the ultimate mixing repository coincident with or pursuant to attainment of any preliminary, or the ultimate balance of the bridge circuit. This may be as an added function of the relay component of unit 16.

In calibrating the scale, an added differential transformer is provided, the armature of which is moved and adjusted by a calibrated micrometer screw and this is plugged into the circuit so that it electrically replaces the one associated operatively with the scale. This may be adjusted to the desired weight and the proper potentiometer, either of the single one disclosed or of the plurality shown in Fig. 2, is adjusted until the relay just operates with no weight on the scale. The relay 16 may be set up to either drop out or to pull in when the voltage bridge is at null. A very high degree of resolution is obtainable with this system and the set point may be located remotely with an accuracy of .025% or better.

It will be seen that the illustrative single bridge circuit and material-supply organization of Fig. 1 will lend itself to batching procedures by simple switching operations of a plurality of potentiometer circuits. For this purpose, points "a" and "b" in the output of the bridge circuit, on leads respectively 50 and 51 from the center tap of the series-coupled secondaries, and from the arm 45 of the potentiometer, may be considered as tap-off or switching points. This is to avoid unnecessary duplication of disclosed parts in the circuits which follow, and provides means by which the output of a plurality of circuits, each formed by the common differential transformer, and a given potentiometer may be made incident on a succession of material chutes delivering to the same weigh chamber 12.

Let it be assumed that the batching control is, illustratively, for batches with three components, say, of aggregate, sand, and cement, for concrete. For "n" components it is only necessary to provide "n" potentiometer circuits, as will be clear. Let it be assumed further that the single weighing scale and hopper arrangement is provided, with a plurality of individual chutes from individual material supply bins in position to deposit material into the common weigh chamber 12. The differential transformer will be actuated as a function of weight delivered to the weigh chamber and incident on the scale, selectively coupled with the complemental portions of the plurality of bridge-circuit components, i. e. the potentiometer for the bridge, and the slide elements thereof for the bridge output circuits.

Referring to Fig. 2, differential transformer 21 is provided, with primary 22, and with secondaries 23 and 24, the center tap 40 of which joins a connector 50 leading to point "a," leading into the amplifier and relay organization 16. The outer end of secondary 24 leads through a resistance 39 by connector 46 to a common terminal 54, of the illustratively three-position switch arm 55, of a first switch 29, selectively engageable with manual or automatic change of switch position with any of contacts 56, 57, and 58. The outer end of secondary 23 leads, through resistance 47, by common connector 74 related to connector 48 of Fig. 1, to one end of a first potentiometer 41, as in Fig. 1. Potentiometer 41 is provided with arm 45, dividing the potentiometer into legs 43 and 44, and the outer end of arm 45 leads, by connector 60, to a contact 61 of a second switch 62. The latter has an arm 63 movable in synchronism with the arm 55 of the first switch, by a connection 64. The switch arm 63 of the second switch is selectively movable, with switch arm 55, to engage contacts 61, 65, and 66, of the second switch. The arm 63 of the second switch connects to point "b," leading to the relay and amplifier unit 16 of Fig. 1, as one lead of the bridge circuits outputs. The other end of potentiometer 41 leads to contact 56 of the first switch 29.

A second potentiometer 70 is provided, the movable arm 71 of which divides the potentiometer 70 into legs 72 and 73. Arm 71 is connected to second switch terminal contact 65. One end of the potentiometer 70 is connected with terminal contact 57 of the first switch, while the other end thereof connects with common connector 74, leading to the end of leg 44 of the first potentiometer 41, and also to one end of a third potentiometer to be described.

A third potentiometer 75 is provided, the movable arm 76 of which divides the potentiometer 75 into legs 77 and 78. The lower end of leg 78 is joined to the common connector 74. Sliding arm 76 of this last potentiometer is connected to contact 66 of the second switch 62. The upper end of leg 77 leads to contact 58 of the first switch. With more ingredients in the batch, additional potentiometers will be provided.

While the first and second switches 29 and 62 respectively are shown, for illustration, in their median setting, it will be understood that in the usual course the standard common differential transformer and its condition-responsive actuating means, illustratively the scale, will initially be connected with that potentiometer of the series, associated with that supply of material preferred to supply the first of the batch to enter the repository or weigh chamber. To illustrate the functioning of the plural circuits of Fig. 2 let it be assumed that potentiometer 75 is in a voltage bridge circuit with transformer 21. For this purpose, switches 62 and 29 are moved to engage arm 63 with contact 66, and arm 55 with contact 58, respectively. This establishes a voltage bridge circuit, one half of which is comprised of leg 78 of potentiometer 75, and common connector 74 with secondary leg 23 of transformer 21, completed by the other half thereof, formed by potentiometer leg 77 and secondary 24 of differential transformer 21, connected through the first switch terminal contact 58, first switch arm 55, and connector 46. The output of this circuit, which, as noted, may be "n" circuit, although for convenience designated herein as a third circuit, on one side is from potentiometer arm 76 to contact 66 of the second switch, through switch arm 63 to "b," leading to the relay and amplifier unit. The other side of the output is from the center tap 20, to "a," to the relay and amplifier unit. The details of the relay are not important as such devices per se are quite well known in the art. The relay may be a stepped or program relay, and may incorporate time delay factors as desired. In the illustrative case it will be assumed as noted that the batching is for the formation of concrete. As soon as the switches are actuated, the thus organized third, or "n," circuit will instantaneously be unbalanced and the relay will be actuated to start the flow of material into weigh chamber 12. Illustratively, then, the third, or "n," circuit, organized in its essentials according to the diagram of Fig. 1, will deliver a predetermined supply of "aggregate" through the "aggregate" chute or other transmission device, into the weigh chamber 12. The amount of aggregate delivered is a function of the setting of the potentiometer arm 76, as will be clear. When the weigh chamber has received its proper weight of "aggregate," according to the particular formula used, and the differential transformer armature has been moved by the imposed weight far enough to balance the third circuit, the solenoid of the valve is actuated to shut off the supply. A time delay is preferably introduced into the relay, or which may be an added function of the switching operations of the relay. This facilitates complete closing of the valve controlling the flow of the first material, before the valve controlling the second material is opened. At the conclusion of the delay, if provided, the first and second switches are automatically actuated together by the relay, to swing the respective arms thereof to engagement with the respective terminal contacts for a second circuit controlling delivery of the second ingredient to the weigh chamber 12. As will be understood, the second circuit, comprising the potentiometer 70 and the differential transformer 21, will control the supply of "sand," for instance to be delivered to the weigh chamber 12. The potentiometer arm 71 will be positioned to predetermine the weight of sand delivered, added to the "aggregate" in the weigh chamber 12. This is an adjustment in excess of that required for the third material alone, as the weight of the "aggregate" has moved the armature 20 to achieve balance with the third material, and movement of switches 29 and 62 establishes the second circuit with the armature displaced by the preceding material. Finally, by further conjoint actuation of the first and second switches 29 and 62, the first circuit, the duplication of that of Fig. 1, is initiated for the controlled delivery through its chute of the required amount of cement or other first ingredient. Again the potentiometer setting of potentiometer 41 will be adequate to weigh the first ingredient on top of the second and third ingredients. It will be seen that three components of the ultimate batch are successively delivered and weighed and that the relative proportions of the respective components can be predeterminedly varied within the ranges of the potentiometers by adjustment of the respective arms thereof.

It is preferred that the amplifier and relay means effect automatic switching between circuits, as well as controlling the valve modifying the flow.

It is repeated that the three circuits of Fig. 2 are illustrative of any plurality of circuits that may be provided, depending upon the maximum number of components any given batch is to comprise.

The illustrative case of Fig. 2 contemplates a given number of circuits which are individually adjusted or predetermined and variable to apportion an alloted weight to a given component of a formula, and with changes in the instant formula, the settings of the respective potentiometers are individually changed. This is simple and adequate for the mixing of batches of varying proportions with the same agencies. However, it will be understood that there are many situations in which there may be a multiplicity of formulas for widely different components. Thus, there may be a plurality of different formulas for concrete, for example, and in the use of the apparatus it may be desired to mix certain batches according to one formula organization, and then with minimal delay to mix other batches according to another formula. With frequently used alternative formulas, it is time-consuming to make the alterations in the potentiometer settings, necessary to move from one composition to another, and return, or to adjust for still a further composition formula.

It is frequently desirable to provide a multiplicity of formulae or batch settings, which, once set, can be retained and called into use when instantaneously desired in accordance with an instantaneous demand situation. For instance, in certain chemical and other batching procedures, there may be a wide range of formulas each requiring individual batching, with different components or materials, according, for instance, with whether the batching relates to rubber compositions, general chemical formula, plastics, concrete, or any other of the wide range of materials formed by batching procedures. To take care of this multiplicity of batching formula, the circuit organizations in the electrical network of Fig. 3 may be used.

Referring to Fig. 3, it will be seen that one standard differential transformer and weighing scale organization is provided, with which is selectively associated one group of potentiometers for each batch or formula, with one potentiometer in each group operative for each respective material. A plurality of groups of such potentiometers is provided. A manually controlled selector switch is provided for selecting the designated one of the plurality of batch formula settings. Finally, a material-selector switch is provided which may be manual, but which is preferably automatic, which progressively or selectively couples the respective potentiometers of the selected group thereof, with the single scale organization.

For simplicity, three groups, respectively "A1, B2, and C3" with three potentiometers in each group, are provided. One end of each of the potentiometers of all groups is connected to a common connector 74', extending to the free end of transformer secondary 23, through resistance 47. The other ends of the respective potentiometers lead to respective contacts of the "batch selector" switch 130 to be described. Thus, in group A1, potentiometer 90 connects to contact 91. Potentiometer 92 connects to a contact 93, and potentiometer 94 connects to contact 95. In group B2, potentiometer 96 joins contact 97, potentiometer 98 joins contact 100, and potentiometer 101 joins contact 102. In group C3, potentiometers 103, 105, and 107, respectively, join contacts 104, 106, and 108 respectively.

Relatedly, the adjustable arms of the respective potentiometers join contacts in the batch-selecting switch 130. Thus, in group A1, arms 110, 112, and 114, respectively join contacts 111, 113, and 115 respectively. In group B2, arms 116, 118, and 121, respectively, join contacts 117, 120, and 122 respectively. In group C3 arms 123, 125, and 127 respectively join contacts 124, 126, and 128, respectively. All of these contacts are in the batch selector switch 130.

The manual batch selector switch 130 comprises, in the illustrative simplified circuits shown, six switch arms, three of which are in the output circuit of the system, and three of which are in the bridge circuits. All are actuated in synchronism by a common switch element connector 129, and each arm, illustratively, has three circuit-making positions, between which it is movable. Thus, switch arm 131, having its own switch terminal contact 141 in the material selector switch 150 to be described, is selective to engage any of the three contacts 111, 117, and 124. Switch arm 132, having its own terminal contact 142 in the material switch, is selective to engage any of the three contacts 113, 120 and 126. Switch arm 133, having its own terminal contact 143 in the material switch, is selective to engage any of the three contacts 115, 122, and 128. These three mentioned switch arms have their own terminal contacts as noted, for selective engagement by movable switch arm 144 of switch 150, leading to point "b." Switch arms 131, 132, and 133, therefore, constitute bridge output-controlling switch members.

The other three adjustable arms of the batch-selector switch 130 have respectively terminal contacts for selective engagement by a switch arm 148 in the material switch 150, as will be discussed, and are as follows: Arm 134, joining terminal contact 145, and selectively engaging contacts 91, 97, and 104; arm 135, joining terminal contact 146 and selectively engaging contacts 93, 100, and 106; and arm 136, joining terminal contact 147, and selectively engaging contacts 95, 102, and 108. The material selector switch incorporates the movable switch arm 148 respectively engageable with potentiometer terminal contacts 145, 146, and 147. Switch arms 144 and 148 of material selector switch 150 are coupled for synchronous movement by a connector 149. Switch arm 148 is electrically in communication with common connector 46', leading to secondary 24 of the differential transformer 21 through resistance 39.

The apparatus described and shown in Fig. 3 will have three delivery chutes from supplies to be metered, all repetitions of that shown in Fig. 1. Actually, there may be "n" chutes and supplies and circuits. With the circuits illustrated the operator can select any of "n" formulae and fill the weigh chamber successively with "X" lbs. of ingredient #1; "X" lbs of ingredient #2; "X" lbs. of ingredient #3, etc.

The particular batch selected will be in accordance with the characteristics and proportions of the particular batch, usually predetermined and set in the apparatus. For example, with the manual batch selector switch 130 in the position shown in Fig. 3, the switch arm 131 engages contact 117, connected to the potentiometer arm 116 of potentiometer 96 of group B2. With the material selector switch 150 moved upwardly from the position shown, the output of this potentiometer, through contact 141, passes through switch arm 144 to "b" to the relay. At the same time the potentiometer 96 itself, through contact 97, engaged by switch arm 134, leads to the terminal contact 145, then engaged by switch arm 148 of switch 150, to complete the bridge circuit with the secondaries of the differential transformer 21, through connector 46'. Potentiometer 96 is the only one which is instantaneously coupled in operative relation in a bridge circuit with its output operative on the relay. With the completion of this circuit, the desired amount of ingredient #1 is delivered into the weigh chamber, which delivery is cut off when the bridge circuit is brought back into balance.

The other respective potentiometers and the output arms thereof are connected with contacts which are either out of contact with the switch arms of the batch selector switch 130, or, if so engaged, are out of contact by their respective terminal contacts with the respective switch arms 144 or 148 of the material selector switch 150.

After the predetermined amount of ingredient #1 has been placed in the weigh chamber, and the delivery valve therefor has been shut, the manual or automatic material selector switch 150 moves from its upward disposition to the middle position indicated by the full lines of this switch. This causes switch arm 144 to break its engagement with terminal contact 141 and to engage contact 142, and switch arm 148 to leave terminal contact 145 and to engage terminal contact 146. As the batch selector switch 130 remains stationary, this establishes an output circuit lead from arm 118 of potentiometer 98 through contact 120, switch arm 132, terminal contact 142, switch arm 144 to "b." Simultaneously, it places potentiometer 98 in a bridge circuit, through contact 100, switch arm 135, terminal contact 146, switch arm 148, and common connector 46'. The relay is operated to deliver the predetermined amount of ingredient #2 in the weigh chamber, and to shut off the delivery when this amount has been delivered. Again, either manually or automatically by the relay, switch 150 is actuated to move arms 144 and 148 respectively, from terminal contacts 142 and 146, respectively, to engagement with terminal contacts 143 and 147 respectively.

This last switch actuation, through switch arm 133 and contact 122, places the arm 121 of potentiometer 101 of group B in the bridge output circuit, passing through terminal contact 143 and switch arm 144 to "b." Simultaneously, potentiometer 101 through contact 102, switch arm 136, terminal contact 147 and switch arm 148, has been placed in a bridge circuit with differential transformer 21.

It will be understood that with elevation of the batch selector switch, the respective potentiometers of group A1 will be successively brought into active measuring relations, as the material selector switch is successively progressed. With lowering of the batch selector switch the potentiometers of group C3 will be successively brought into measuring relations as the material selector switch is progressed. With additional groups, and with each group of any desired number of potentiometers, and with correspondingly greater numbers of contacts for engagement by the batch selector switch, and greater numbers of terminal contacts for engagement by the material selector switch elements, any range of numbers of materials in a batch, and any range of numbers of formulae desired can be provided. It is repeated that the disclosure of three groups of three potentiometers each is purely illustrative and not limitative, and it is in the interests of simplicity that this small number of components is illustrated.

The simplicity, cheapness and wide range of utility of the invention will be appreciated, as well as the modifications that may be made in the system. In this connection, it will be evident that within the broad purview of the invention, any variable of condition may be used to rebalance the voltage bridge circuit and the invention is not limited to weight as the variable.

Having thus described my invention, I claim:

1. An apparatus for predetermining and measuring a desired weight load, comprising a weigh chamber, a voltage bridge, two legs of which are comprised of two secondaries of a differential transformer in aiding relation having a center connection, said differential transformer further comprising an energizing primary and a relatively movable armature and two legs of which bridge are formed by a potentiometer including a movable arm dividing the potentiometer into two legs, said bridge powered by said primary, said arm and said center connection forming the output circuit of said bridge, means mounting said armature for movement relative to the secondaries, means for moving said armature as a function of a change of applied weight on said weigh chamber, said two means establishing a datum setting of the armature as a function of the instantaneous applied weight on said weigh chamber at which the voltages induced in the respective secondaries area of predetermined proportionate values, said arm manually movable independent of armature movement to a potentiometer setting at which with said armature at its datum setting a predetermined signal exists in said output, the value of which is related to the desired predetermined weight to be applied to said weigh chamber, said bridge functioning toward rebalance with change of the applied weight in the proper sense and effecting rebalance and the neutralization of the signal in the output when the change of applied weight attains that which is predetermined.

2. In condition-controlling apparatus, a movable element transformer having a primary, a relatively movable armature and two secondaries in series-aiding relation with a common junction brought out, a potentiometer having a manually adjustable arm, means coupling the secondaries with the potentiometer in a bridge circuit powered by said primary, means for holding said armature in a set position with any fixed condition of an associated variable and for relatively moving said armature with respect to the said secondaries as a function of a change in condition of said variable, said common junction and said arm forming the output from said bridge, said arm being manually adjustable independently of the setting or relative motion of said armature to establish with a given setting of said armature a predetermined signal in said output circuit correlated with a desired change in condition of said variable, means controlled by said output circuit operative in one sense to effect a change in said condition with the predetermined signal in said output and operative in an opposite sense to terminate the change in said condition upon substantial nullification of said signal, whereby the condition of said associated variable can be predeterminedly changed from a first instantaneously fixed condition to a second instantaneously fixed condition by establishing a relative armature setting consonant with the first fixed condition, manually adjusting said arm to create an output signal from said bridge correlated with the desired change, using the signal to effect the desired change in condition, using the change in condition to relatively move said armature toward nullification of said signal and stopping the change of condition when the signal is substantially nullified with attainment of the second fixed condition, in which the variable is weight, and a weighing and control system, said system comprising a weighing scale, translating means between the scale and the armature to translate the scale response into armature motion, a material supply, a delivery device between the material supply and the scale, and an electrically controlled valve operative on the delivery device and operated by said working circuit.

3. Apparatus for measuring a plurality of respective variables, comprising a differential transformer formed of two secondaries in aiding relation with a common junction brought out, an energizing primary, and a relatively movable armature controlling the voltages induced in the respective secondaries, a first and a second potentiometer, each of said potentiometers having a movable element dividing the respective potentiometers into two legs, means selectively operable to couple said first potentiometer into a bridge circuit with said secondaries powered by said primary, said means operable to uncouple the first potentiometer and to couple the second potentiometer into said bridge circuit with said secondaries, means responsive to a variable for positioning said armature relative to said secondaries as a function of change of condition of said variable, said last means effective to establish a datum armature setting consonant with a datum condition of said variable, both of said respective potentiometer elements being susceptible to predetermined adjustment when coupled into a bridge circuit relative to a given datum setting of the armature to unbalance the instantaneous balance of the bridge and establish an output signal from the center tap and the respective element of the selected potentiometer as a function of a predetermined ultimate change in said condition, said armature being relatively positionable in either bridge circuit with changes of condition until the predetermined change in condition is attained at which the bridge is rebalanced and the output signal nullified, and means responsive to rebalance of the bridge formed with the first potentiometer, to actuate the selectively operable means to uncouple the first potentiometer and couple the second potentiometer with the secondaries of said transformer.

4. A condition-controlling apparatus comprising a differential transformer having a primary and two secondaries in series aiding relation having a common junction brought out and a relatively movable armature, a first and a second potentiometer each having an independently adjustable arm dividing its respective potentiometer into two legs, means selectively operable for coupling the respective potentiometers alternatively into a first and a second voltage bridge circuit with said secondaries, a scale, translating means between the scale and said armature to position the latter relatively to the secondaries as a function of weight imposed on the scale, said respective bridge circuits having outputs formed by the common junction and the arm of that potentiometer instantaneously coupled in the bridge, said arms being respectively adjustable independent of said armature to establish a predetermined signal in the output circuits of the respective bridge circuits, a first and a second material supply, first and second delivery means for delivering material from the respective supplies to the scale, first and second electrically controlled means operatively associated with the respective delivery means to effect respective delivery and cut-off, means in said respective output circuits for controlling said respective electrically controlled means to apply material from the first supply to the scale with the first bridge circuit, stopping when armature movement has balanced the first bridge circuit, and to deliver material from said second supply to the scale, stopped when further armature movement has balanced the second bridge circuit.

5. A batching control system comprising a receptacle, a differential transformer comprising coils and a relatively movable armature, said coils comprising a primary and two secondary coils, a plurality of potentiometers each having an independently adjustable arm, means for selectively placing selected potentiometers alternately in a bridge circuit with said secondaries, a connection from the secondaries forming one leg of an output circuit from each bridge circuit of which the slide element of the instantaneously coupled potentiometer is the other leg, means responsive to applied load on the receptacle for relatively moving the armature and coils, and means operated by the output circuit of the instantaneous bridge for controlling the uncoupling of one potentiometer and the coupling of another of said plurality into a bridge circuit with the differential transformer, and means operated as a function of output conditions of a given bridge circuit for controlling the amount of a given material placed in said receptacle.

References Cited in the file of this patent

UNITED STATES PATENTS

| | | |
|---|---|---|
| 1,889,663 | Illyus | Nov. 29, 1932 |
| 2,632,599 | Hornfeck | Mar. 24, 1933 |
| 2,044,017 | Robb | June 16, 1936 |
| 2,208,284 | Weckerly | July 16, 1940 |
| 2,285,765 | Carswell | June 9, 1942 |
| 2,398,643 | Jerome | Apr. 16, 1946 |
| 2,432,422 | Hornfeck | Dec. 9, 1947 |
| 2,559,919 | Gustafsson | July 10, 1951 |
| 2,564,221 | Hornfeck | Aug. 14, 1951 |
| 2,607,555 | Noble | Aug. 19, 1952 |